FREQUENCY SHIFT MEASURING SYSTEM

Original Filed May 21, 1954 3 Sheets-Sheet 1

*INVENTOR.*
ALTON O. CHRISTENSEN
*BY*
B. L. Zangerle
ATTORNEYS

*INVENTOR.*
ALTON O. CHRISTENSEN

*BY*

B. L. Langwell
ATTORNEYS

FREQUENCY SHIFT MEASURING SYSTEM

Original Filed May 21, 1954 3 Sheets-Sheet 3

*INVENTOR.*
ALTON O. CHRISTENSEN
*BY*
B. L. Zangwill
ATTORNEYS

United States Patent Office

Re. 24,407
Reissued Dec. 17, 1957

24,407

FREQUENCY SHIFT MEASURING SYSTEM

Alton O. Christensen, Rolfe, Iowa, assignor, by mesne assignments, to the United States of America as represented by the Secretary of the Navy Original No. 2,802,985, dated August 13, 1957, Serial No. 431,309, May 21, 1954. Application for reissue September 27, 1957, Serial No. 686,805

3 Claims. (Cl. 324—79)

The present invention relates to a circuit for measuring the difference between two frequencies, and more particularly to a circuit for measuring the difference in frequency between two signals without particular regard to the finite frequencies of the two signals.

In certain types of radio transmission, the intelligence is transmitted by changing the frequency of the transmission carrier from one predetermined value to another. When such a wave is received, a very stable receiver is used, and its output is used to actuate printing or indicating devices. In the operation of this system, known as frequency-shift keying, it is desirable to be able to determine the amount the carrier frequency is varied in keying. The actual transmitted frequencies, as applied to such measurement, are not important, since they may be readily changed by heterodyning against a variable local oscillator.

In radio teletype transmission employing frequency-shift keying a "mark" is indicated by a first frequency and a "space" is indicated by a second frequency, the transition from one frequency to the other being made by switching. The two frequencies are normally spaced only a small percentage apart so that static or other interference will be substantially the same with either frequency and may be substantially eliminated by "bucking" the signals. The two frequencies occur sequentially and repetitiously at a rate determined by the rate of transmission.

Presently available frequency deviation measuring circuits employ resonant circuits which require that the frequencies impressed thereon be accurately controlled. Such accurate adjustment of the receiving equipment is undesirable, since time and extra equipment are required, and stability requirements of the receiving apparatus are increased.

The present circuit for measuring the difference between two frequencies can accommodate signals of frequencies varying over a wide range. The adjustment of the receiver is therefore not critical, and minor frequency drifting does not affect the accuracy of the measurement. For this purpose, the signals of the two frequencies are separated, converted into direct current voltages having a magnitude varying directly with frequency, and the difference in the magnitudes thereof is indicated.

It is an object of the present invention to provide a system for indicating the difference between two frequencies impressed thereon.

It is a further object of the present invention to provide a device for indicating the difference in frequency between two signals which is uncritical as to the absolute frequencies thereof.

It is a still further object of the present invention to provide a device for indicating the difference in frequency between two signals which are alternately impressed thereon.

It is another object of the present invention to provide a device to indicate the shift produced in a frequency-shift keying system.

Further objects of the present invention, together with its many attendant advantages will be made apparent to those skilled in the art by reference to the following detailed description and to the appended drawings, in which.

Figure 1:
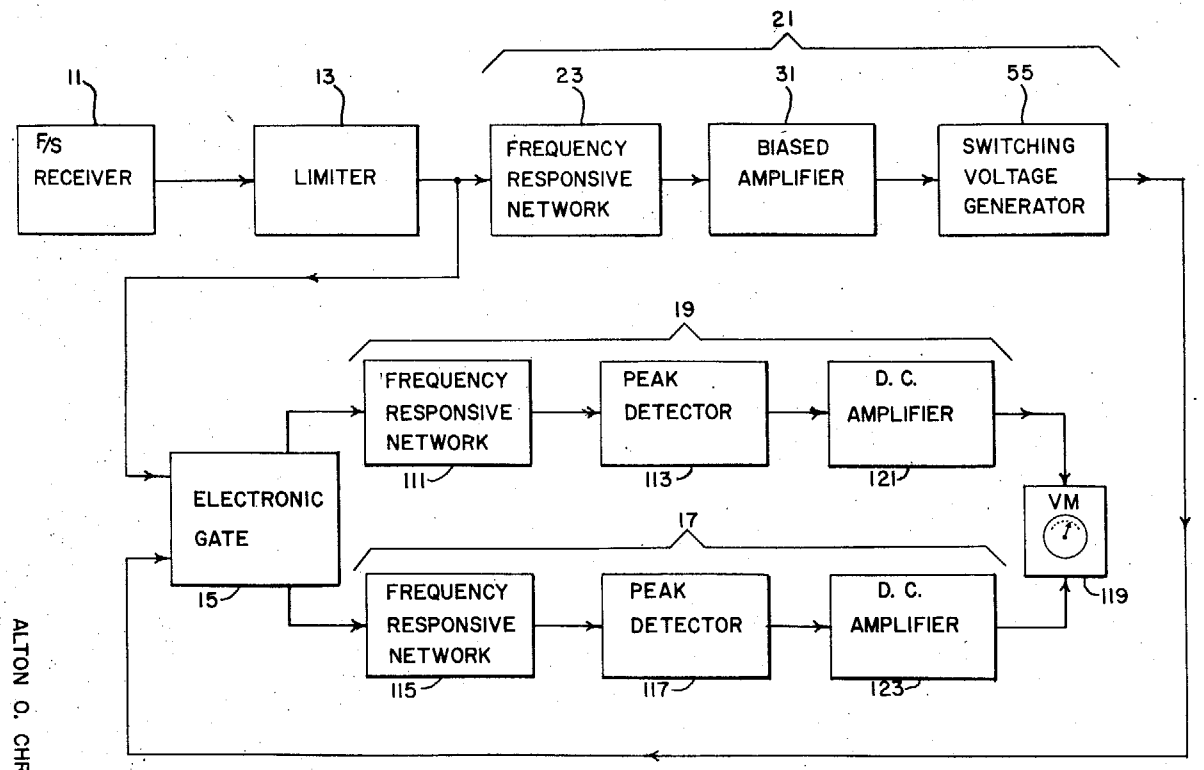
Figure 1 is a diagrammatical showing of a preferred embodiment of the present invention.

Referring now to the drawings wherein like or corresponding parts are indicated by the same reference character, there is shown in Figure 1 a frequency-shift receiver 11 having a signal output comprising one or the other of two frequencies which correspond to the mark and space frequencies of the transmission. The mark and space frequencies occur alternately, and the difference in frequency between them is the factor which is measured by the present invention.

The signal output of the receiver 11 is impressed on the limiter 13 to produce a square wave of constant amplitude and having the same frequency as the signal output. The square wave is impressed on the electronic gate 15 which separates the two component frequencies and impresses them upon the high frequency circuit 17 and the low frequency circuit 19, respectively.

The operation of the gated amplifier 15 is controlled by the switching circuit 21. In the switching circuit, the square wave output of the limiter 13 is impressed on a frequency-responsive network 23 which operates to produce a voltage varying inversely with frequency. While not limited thereto, a suitable circuit for the frequency-responsive network 23 is shown in Figure 2, wherein a simple resistance-capacitive network is employed.

Figure 2:
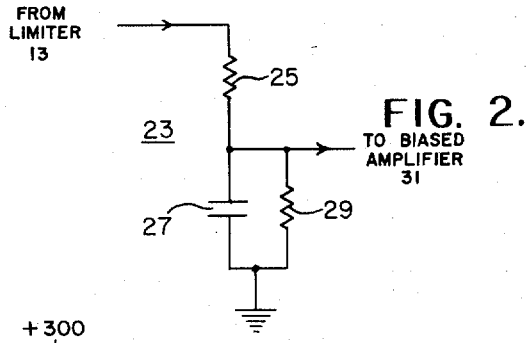
Figure 2 is the circuit of a frequency-responsive network usable in the present invention.

Referring now to Figure 2, the frequency-responsive network 23 may comprise a resistor 25 serially connected with a capacitor 27, the capacitor 27 being paralleled by the discharge resistor 29. The charging time constant of the network is made longer than the duration of the lowest frequency square wave pulse to be applied thereto, while the discharge time is made short. It will be apparent to those skilled in the art that square wave pulses will be converted into saw-tooth pulses of the same frequency, but that lower frequency pulses will be accentuated because the capacitor 27 charges to higher voltages during longer time intervals. The amplitude of the saw-tooth pulses thus varies inversely with frequency, since the amplitude of the square wave impressed thereon is constant.

The output voltage of the frequency-responsive network 23 therefore consists of pulses of different magnitudes, the magnitude varying in inverse proportion to the frequency at the output of the receiver 11. The output of the frequency-responsive network is impressed on a biased amplifier 31 to remove the higher frequency portion of the signal. Since the frequencies and hence the magnitudes of the component "mark" and "space" sections of the signal are variable, the bias on the biased amplifier is made variable with the magnitudes thereof.

Figure 3:
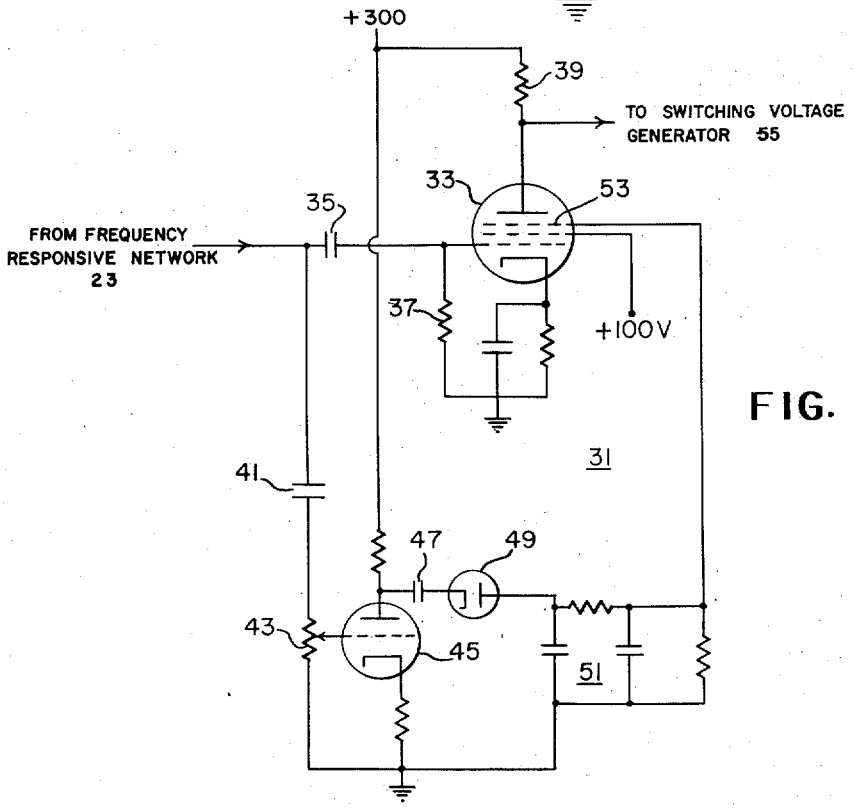
Figure 3 is the circuit of a biased amplifier usable in the present invention.

The biased amplifier 31 may, for the purposes of illustration, comprise a circuit similar to that shown in Figure 3. The saw-tooth output of the frequency-responsive network 23 is impressed on the control grid of a pentode tube 33 through capacitor 35 and grid resistor 37. The pentode tube is self-biased by a cathode resistor and has its anode connected to the anode supply through a load resistor 39. The screen grid of the pentode tube is connected to a source of positive potential in the usual manner. However, the suppressor grid is used to control the anode conduction of the tube and hence the cut-off potential of the control grid with respect to the anode.

The output voltage of the frequency-responsive network 23 is a series of positive-going pulses, which pulses are impressed through capacitor 41 and potentiometer 43 to the control grid of triode phase inverter 45, the triode serving to convert the positive input pulses to negative-going pulses at the output. The output of the phase inverter 45 appears between the anode and ground, and is impressed through the coupling capacitor 47 to the cathode of rectifier 49. The rectified pulses from the diode 49 are impressed on the filter 51 which provides a direct current voltage having a value corresponding to the peak voltage impressed thereon, the time constant being made several cycles long.

The voltage appearing on the filter 51 is impressed on the suppressor grid 53 of pentode tube 33, and is adjustable by means of the potentiometer 43 to provide the desired degree of biasing desired. It will be noted that the bias applied to the suppressor grid 53 causes the tube to pass the high voltage pulses and to gate out the low voltage pulses of the signal from network 23. The magnitude of the bias voltage varies as a function of the amplitude of the low frequency signal from network 23 to automatically maintain the correct bias voltage. The output signal from the biased amplifier is inverted but otherwise similar to the input thereto with the high-frequency component removed, and is used to control a switching voltage generator 55.

Figure 4:
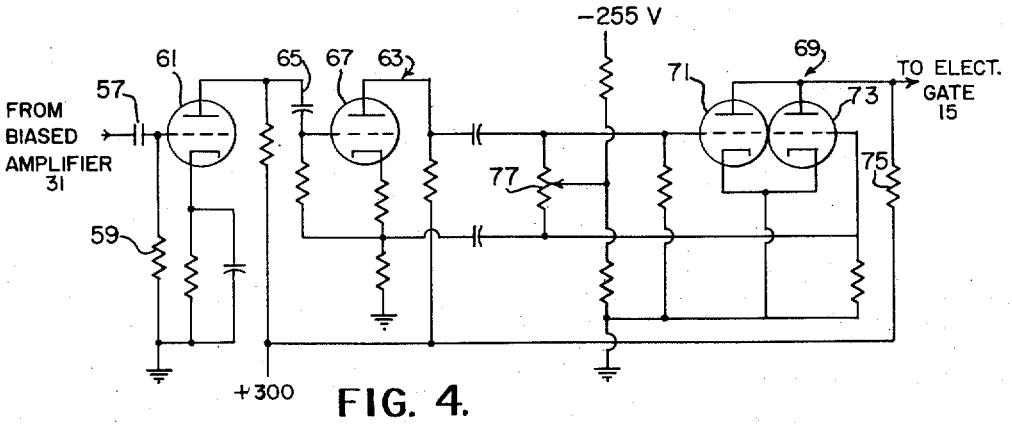
Figure 4 is the circuit of a switching voltage-generator usable in the present invention.

The switching voltage generator 55 operates to produce a square wave voltage having the same frequency as, and approximately in phase with, the keying rate of the transmission. While any desired type of circuit may be employed, a suitable circuit is illustrated in Figure 4. The negative-going pulses from the biased amplifier 31 are impressed through the coupling capacitor 57 and grid resistor 59 on the control grid of limiter tube 61. The limiter tube is operated with a large bias resistor and a large anode load resistor, so that it may be readily cut off and saturated, and therefore produces a square-wave output. The square wave output of the limiter is impressed on the paraphase amplifier 63 through the coupling capacitor 65 which removes the direct current component therefrom.

The paraphase amplifier 63 comprises a triode tube 67 having equal cathode and anode load resistances to produce substantially equal and opposite replicas of the input signal.

The negative peak inverter 69 comprises a pair of triodes 71 and 73 having a common anode resistor 75, the respective grids being biased to cut off by means of the potentiometer 77 which has at its arm a voltage of approximately −50 volts. The two voltages from the paraphase amplifier 63 are impressed on the respective grids of triodes 71 and 73. It will be apparent that negative signals will produce no output across the load resistor 75, but that positive signals will cause conduction through tube 71 or 73 which will produce an output voltage thereacross. Since equal and opposite voltages are impressed on the grids, both halves of the square wave output of the limiter tube 61 appear as negative voltages across load resistor 75. The output of the switching circuit 21 is therefore a negative-going pulse appearing at the anodes of triodes 71 and 73.

As previously mentioned, the square wave output from the limiter 13 is impressed on the gated amplifier 15 which is controlled by the voltage pulses from the switching circuit 21, the output of which is a square wave having a frequency corresponding to the keying rate of the transmission. The square wave is applied in phase opposition to two circuits which transmit the high or low frequency component of the signal from the limiter 13 and block the other.

Figure 5:
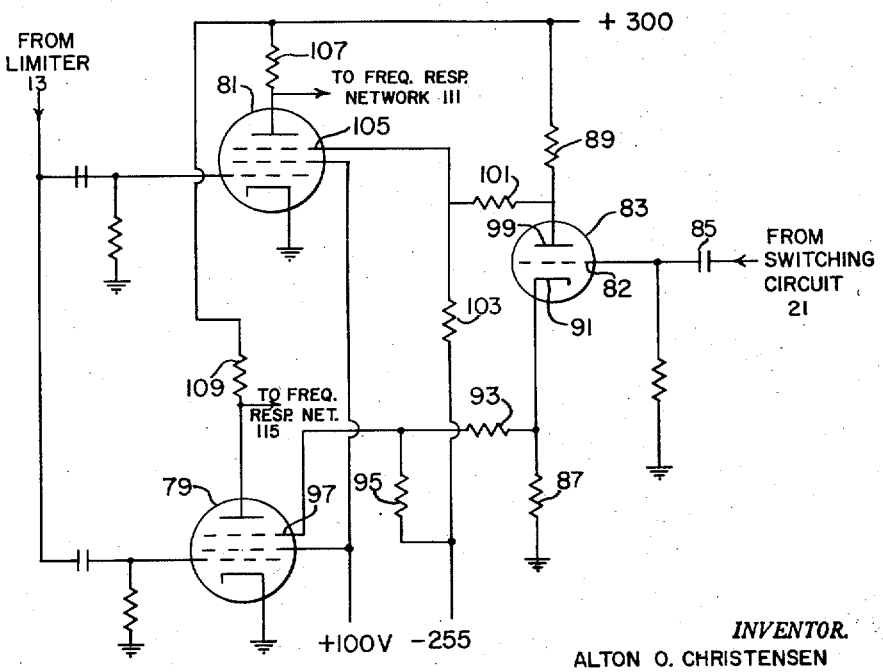
Figure 5 is the circuit of gated amplifier usable in the present invention.

While many types of circuits may be used, a suitable circuit for the electronic gate 15 is shown in Figure 5, wherein two pentode tubes 79 and 81 are arranged to be controlled jointly by the output of the limiter 13 impressed on the grids in parallel and by a switching voltage applied on the suppressor grids. The switching voltage from the switching circuit 21 is impressed on the grid 82 of control tube 83 through coupling capacitor 85, the control tube 83 being connected in a circuit including cathode load resistor 87 and anode load resistor 89 across which appear voltages in phase with and in phase opposition to the switching voltage, respectively. The cathode 91 is connected to a negative voltage through the voltage divider comprising resistors 93 and 95 to a source of negative potential (−255 v.), and the juncture thereof is connected to the suppressor grid 97 of pentode tube 79. Similarly, the anode 99 of control tube 83 is connected to a point of negative potential (−255 v.) through a voltage divider composed of resistors 101 and 103 and the juncture of the resistors is connected to the suppressor grid 105 of pentode tube 81.

The voltages impressed on the suppressor grids 97 and 105 are such that when a negative signal is applied to the control grid 82, the voltage at the anode 99 is raised, thus raising the voltage on suppressor grid 105 to allow pentode tube 81 to conduct a current through anode resistor 107 under the control of the input from limiter 13. However, the voltage on suppressor grid 97 is made more negative at the same time. A positive signal applied to control grid 82 renders pentode tube 79 responsive to its control grid, thus producing a signal voltage across load resistor 109.

The low frequency component of the signal from the limiter 13 occurs when the voltage from the switching circuit 21 is negative, so that this portion of the signal occurs across load resistor 107, while the high frequency component occurs across load resistor 109. The signal is thus separated into its two components.

The low frequency component appearing across load resistor 107 is applied to the frequency responsive network 111 which may take the form shown in Figure 2, and produces a voltage varying inversely with frequency, which voltage is impressed on the peak detector 113. The peak detector may be of any type desired but may be similar to circuit shown in Figure 3 including tube 45, rectifier 49, and filter 51, and provides a direct current voltage proportional to the peak voltage produced by the frequency-responsive network 111.

The high frequency component of the signal from limiter 13 is impressed on the frequency-responsive network 115 and peak detector 117, which may be similar to the frequency-responsive network 111 and peak detector 113. The output of the peak detector 117 is a direct current voltage varying inversely with the frequency of the high frequency section of the signal.

The direct current voltages from peak detectors 113 and 117 are combined in opposition to each other and impressed on the voltmeter 119. Where the voltages are of sufficient magnitude, they may be directly combined. However, if desired, direct current amplifiers may be inserted in the circuit as indicated by 121 and 123 in Figure 1. Obviously, any direct current amplifier circuit may be used as desired, since good high-frequency response is not required.

Since the voltages impressed on the voltmeter 119 both vary inversely with the frequencies of the mark and space signals, the difference between these voltages is directly proportional to the difference between the two frequencies. The voltmeter 119 may therefore be calibrated directly in frequency. Variations in the absolute frequencies of the signals automatically balance out, and the switching circuit automatically adjusts itself to operate over a wide frequency range.

While only a preferred embodiment of the present invention has been described herein, it will be obvious to those skilled in the art that many changes and modifications thereof are possible without departing from the spirit thereof, and it is desired to protect all such modifications as fall within the scope of the appended claims.

I claim:

1. A device for measuring the difference in frequency between a first and a second repetitiously applied sequential signals comprising, a first frequency-responsive network connected to receive said signals for accentuating the first signal over the second, means responsive to said first signal to produce a switching voltage having a frequency equal to the repetition rate of the signals, electronic gating means connected to receive said first and second signals and said switching voltage, said electronic gating means separating said first signal from said second signal, second and third frequency responsive networks connected to said gating means and to which said first signal and second signals, respectively applied for producing output voltages proportional to the respective frequencies of said first and second signals, and means connected to said first and second frequency-responsive networks for indicating the difference between said output voltages whereby to indicate the difference in frequency between said first and said other signals.

2. A device for measuring the difference in frequency between a first and a second repetitiously applied sequential signals, a limiter connected to receive said first and second signals and to produce therefrom constant amplitude square waves having the same frequencies as said first and second signals, switching voltage generating means connected to said limiter for producing a switching voltage having a frequency equal to the repetition rate of said two signals, first circuit means connected to said limiter and to said switching voltage generating means for producing a first voltage having a magnitude proportional to the frequency of said first signal, second circuit means for producing a second voltage proportional to the frequency of said second signal, and means connected to said first and second circuit means for indicating the difference between said first and second voltages, whereby to indicate the difference in frequency between said first and said other signals.

3. The device as claimed in claim 2 wherein said first and second circuit means each comprise a frequency-responsive network for producing a sawtooth voltage inversely proportional to the frequency of the constant amplitude square waves impressed thereon, a rectifier connected to said frequency responsive network, and a filter connected to said network, whereby to produce a direct current voltage varying inversely with the frequency of the waves impressed thereon.

References Cited in the file of this patent

UNITED STATES PATENTS

| | | |
|---|---|---|
| 2,176,742 | La Pierre | Oct. 17, 1939 |
| 2,590,641 | Musk | Mar. 25, 1952 |
| 2,592,825 | Rutenberg | Apr. 15, 1952 |
| 2,613,271 | Trevor | Oct. 7, 1952 |